United States Patent [19]

Escue

[11] 4,427,203
[45] Jan. 24, 1984

[54] SEALING ASSEMBLY FOR ROTATABLE SHAFTS

[76] Inventor: Jesse W. Escue, 1010 Buell Ave., Joliet, Ill. 60435

[21] Appl. No.: 400,910

[22] Filed: Jul. 21, 1982

[51] Int. Cl.³ .................. F16J 15/34; F16J 15/40; F16J 15/54
[52] U.S. Cl. .................. 277/81 R; 277/1; 277/65; 277/197
[58] Field of Search .......... 277/1, 9, 65, 93 R, 277/81 R, 85, 95, 134, 135, 153, 152, 188 R, 189.5, 192, 197, 198, 208, 215

[56] References Cited

U.S. PATENT DOCUMENTS 1,946,619  2/1934  Furman et al. .......... 277/1 X
3,188,096  6/1965  Wilkinson .............. 277/65 X
4,215,870  8/1980  Escue ................. 277/93 R

FOREIGN PATENT DOCUMENTS 55-147035  2/1980  Japan ................. 277/153

Primary Examiner—Stuart S. Levy
Assistant Examiner—Lloyd D. Doigan
Attorney, Agent, or Firm—Arnstein, Gluck, Lehr, Barron & Milligan

[57] ABSTRACT

A sealing assembly for a device having a rotatable shaft. The assembly includes a stationary seal member associated with the device which has an opening generally conforming to the rotatable shaft and a rotatable seal member adapted to engage and cooperate with the stationary seal member for effecting a seal therebetween, the rotatable seal member being adapted to be mounted on the rotatable shaft for rotational movement therewith. With this arrangement, the rotatable seal member is also adapted to engage and cooperate with the rotatable shaft for effecting a seal therebetween.

16 Claims, 6 Drawing Figures

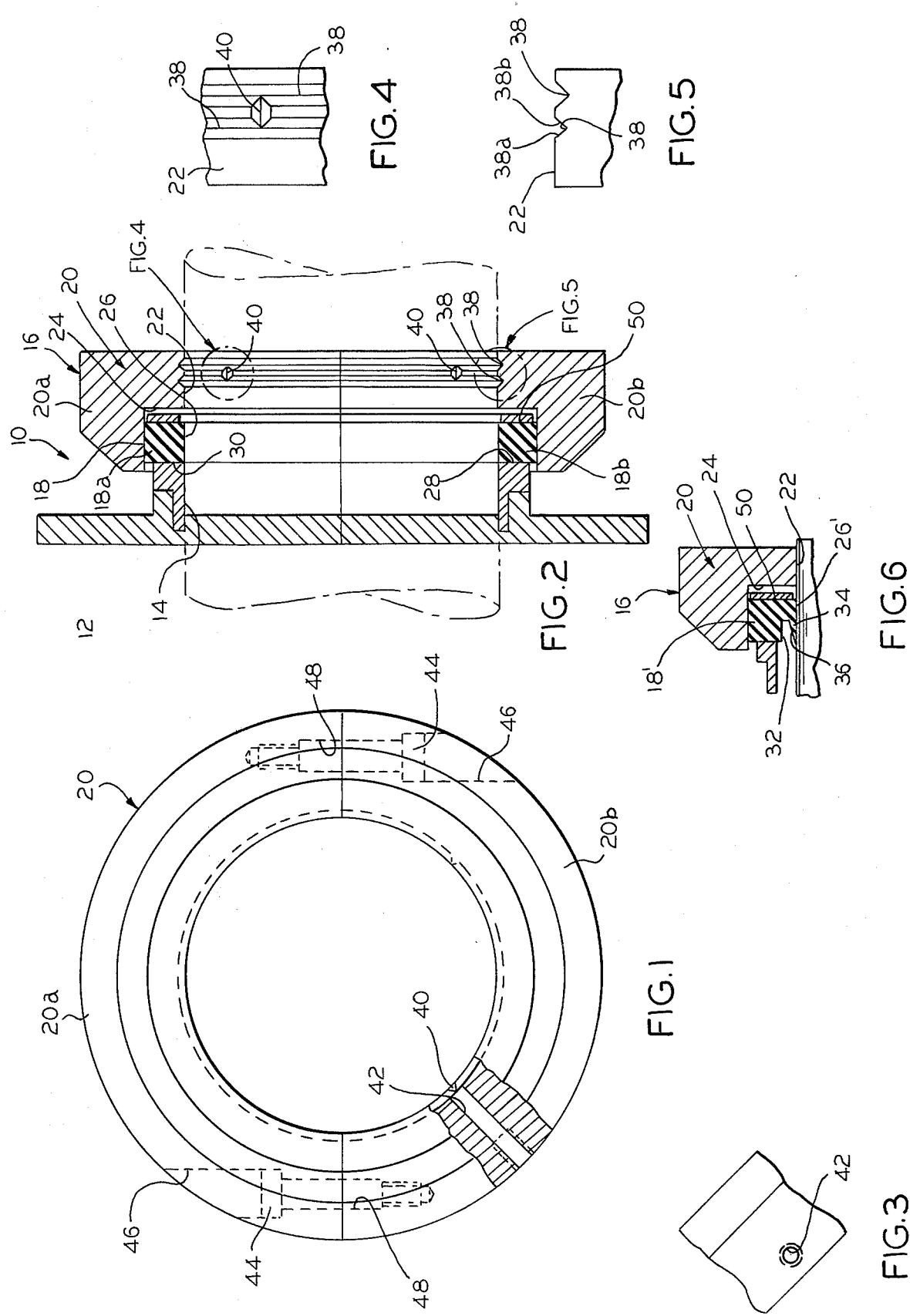

SEALING ASSEMBLY FOR ROTATABLE SHAFTS

BACKGROUND OF THE INVENTION

The present invention is generally related to shaft seals and, more particularly, to a sealing assembly for rotatable shafts. Specifically, the present invention is directed to effecting a seal between a rotatable seal member and a rotatable shaft. In various types of machinery, it is continuously a problem to seal the opening through which a rotatable shaft protrudes. The problem is manifested in the difficulty of preventing leakage or loss of pressure or loss of vacuum while at the same time avoiding undue shaft friction. The shaft friction can generate heat, cause loss of power, and even damage the machinery. One method of effecting a seal at a joint between a stationary element and a rotatable shaft has been through the use of packing, stuffing, or the like. However, packing or stuffing causes considerable friction on the shaft. Another method of effecting a seal has been to utilize O-rings. However, O-rings have presented a problem due to the difficulty of providing a proper material to accommodate the wear thereon when utilized with shafts that operate at high speed. The shaft seals have also for the most part required the machinery to be stripped or dismantled for replacement purposes. The necessity for stripping or dismantling the machinery is most undesirable particularly where the machinery being sealed is large and heavy. Moreover, in order to replace conventional mechanical seals, the machinery must oftentimes be shut down for prolonged periods of time resulting in enormous losses in productivity.

As a result, it has been recognized as desirable to provide the parts of a mechanical seal which are subject to wear in split fashion so that they can be easily mounted and later disassembled for repair or replacement purposes. This was successfully accomplished in my earlier U.S. Pat. No. 4,215,870 issued on Aug. 5, 1980, and in my earlier co-pending patent application U.S. Ser. No. 363,375 filed on Mar. 29, 1982, and seals manufactured according to my patent and patent application have been installed and proven to be highly effective not only in terms of their sealing capabilities but also in terms of their drastic reduction in down time of expensive machinery used in costly processes. With the features of the invention of my earlier patent and patent application, a split-type seal has been provided which can be easily assembled and disassembled relative to machinery without interfering with the positioning or mounting of the stationary element and the rotatable shaft associated with it.

With attempts prior to my earlier patent and patent application to provide a split-type seal, it had been a problem to maintain a complete seal at all times completely about the rotatable shaft. During operation, the seals could easily become worn or deteriorated and the wear and deterioration could be non-uniform circumferentially about the shaft because of a number of reasons such as misalignment of the shaft with respect to the machinery with which it is used, or due to other factors. However, I was able to provide a sealing assembly which overcame the problem of non-uniform wearing or deterioration of the seal parts.

As set forth in my co-pending patent application U.S. Ser. No. 363,375, I later became aware of still additional problems requiring a solution. For instance, sealing assemblies are oftentimes needed in emergency situations. This is particularly true in applications which advantageously utilize the rotatable shaft seal disclosed and claimed in my earlier U.S. Pat. No. 4,215,870 where a seal is quickly needed on machinery used, for instance, in dangerous manufacturing processes such as the grinding of caustic chemicals and the like where time is of the essence and the seal must be made available in the field on extremely short notice. However, the shafts of such machinery vary significantly in size. Since time is of the essence in these applications, and it is not feasible to custom order a split seal from the manufacturer, field service personnel have been required to stock a large variety of seals in order to be able to service a customer on a timely basis.

In my earlier patent application, I successfully overcame these problems with a unique sealing assembly, kit and method for rotatable shafts. This was done by providing a separate insert adapted to be mounted in an insert-receiving opening in the stationary seal member wherein a shaft-receiving opening in the insert is initially dimensioned so as to be smaller than a rotatable shaft and is thereafter adapted to be enlarged in the field before use so as to generally conform to the rotatable shaft. With this arrangement, the sealing assembly is uniquely suited to be selectively applied in kit form.

Despite the significant advances offered by my earlier patent and patent application, I have become aware of still other problems with shaft seals. In particular, and in high pressure environments and for applications in which a shaft has been scarred or is out of round, there can be a tendency for leakage between the rotatable seal member and the shaft. While leakage is undesirable in any situation, it is entirely unacceptable in numerous applications where dangerous materials are involved.

The present invention is directed to solving the above and other problems while enhancing the effectiveness and versitility of the seals described in my earlier U.S. Pat. No. 4,215,870 and co-pending patent application U.S. Ser. No. 363,375.

SUMMARY OF THE INVENTION

Accordingly, it is a principal object of the present invention to provide a sealing assembly for rotatable shafts and, more particularly, an assembly having means for effecting a seal between a rotatable seal member and a rotatable shaft.

In the exemplary embodiment, a sealing assembly for a device having a rotatable shaft is provided. The assembly includes a stationary seal member associated with the device which has an opening generally conforming to the rotatable shaft and a rotatable seal member adapted to engage and cooperate with the stationary seal member for effecting a seal therebetween, the rotatable seal member being adapted to be mounted on the rotatable shaft for rotational movement therewith. With this arrangement, the rotatable seal member is also adapted to engage and cooperate with the rotatable shaft for effecting a seal therebetween.

Preferably, the rotatable seal member includes a collar having an opening generally conforming to the rotatable shaft. The collar advantageously has a recess surrounding the opening and dimensioned larger than the opening to receive a seal insert. The insert may then have an opening generally conforming to the rotatable shaft and a surface adapted to engage and cooperate with a sealing surface on the stationary seal member, the surface of the insert having a groove defining a lip which is forced under pressure into sealing engagement with the rotatable shaft. The lip is advantageously defined in part by a surface defining the opening in the insert and is also defined in part by a surface defining a portion of the groove. Additionally, the surface defining a portion of the groove is preferably tapered so that the lip of the insert is generally wedge-shaped in cross section.

In a preferred embodiment, the opening in the collar is defined as an annular surface dimensioned substantially the same as the rotatable shaft. The annular surface includes at least one, and preferably a pair, of circumferential grooves adapted to receive a sealant, the grooves advantageously being in communication by means of one or more equally spaced axial grooves extending therebetween to disperse the sealant, the collar including a radially extending bore for injecting the sealant to completely fill the grooves. Additionally, the grooves are advantageously generally V-shaped in cross section with each of the grooves being defined by surfaces intersecting at an angle of approximately 90°.

BRIEF DESCRIPTION OF THE DRAWINGS

In the drawings:

FIG. 1 is a cross-sectional view of the sealing assembly with a rotatable shaft shown in phantom lines;

FIG. 2 is a front elevational view, partially in section, of a rotatable seal member in accordance with the present invention;

FIG. 3 is a partial side elevational view of the rotatable seal member of FIG. 1 with a bore being shown for injecting a sealant;

FIG. 4 is a partial inside elevational view of the rotatable seal member of FIG. 1 with grooves being shown for receiving a sealant;

FIG. 5 is a partial cross sectional view of the grooves of FIG. 4 with the surfaces shown at a preferred angle; and FIG. 6 is a partial cross-sectional view of the rotatable seal member of FIG. 1 with a seal insert shown for effecting a seal with a rotatable shaft.

DETAILED DESCRIPTION OF THE PREFERRED EMBODIMENTS

Referring to the drawings, and first to FIG. 2, the reference numeral 10 designates generally a sealing assembly for a device having a rotatable shaft. The sealing assembly 10 includes stationary seal means 12 associated with the device and having an opening 14 generally conforming to the rotatable shaft and rotatable seal means 16 including means for engaging and cooperating with the stationary seal means for effecting a seal therebetween, such as the seal insert 18, the rotatable seal means 16 being adapted to be mounted on the rotatable shaft for rotational movement therewith. With this arrangement, the rotatable seal means 16 also includes means for engaging and cooperating with the rotatable shaft for effecting a seal therebetween, as will be discussed in detail hereinafter.

Still referring to FIG. 2, the rotatable seal means 16 includes a collar 20 having an opening 22 generally conforming to the rotatable shaft (see also FIG. 1), the collar 20 having a recess 24 surrounding the opening 22 which is dimensioned larger than the opening 22 to receive the seal insert 18. The seal insert 18 also has an opening 26 generally conforming to the rotatable shaft and the stationary seal means 12 has a sealing surface 28, the seal insert 18 having a corresponding surface 30 comprising the means for engaging and cooperating with the stationary seal means 12 to effect a seal therebetween. The surface 30 of the insert 18 may have a groove 32 defining a lip 34 adapted to be forced under pressure into sealing engagement with the rotatable shaft, the lip 34 being defined in part by a surface defining the opening 26' in the insert 18' (see FIG. 6). With this arrangement, the lip 34 is also defined in part by a surface 36 defining a portion of the groove 32 which is tapered so that the lip 34 is generally wedge-shaped in cross section.

Referring once again to FIG. 2, the opening 22 in the collar 20 is defined by an annular surface dimensioned substantially the same as the rotatable shaft. The annular surface includes at least one circumferential groove 38, and preferably a pair of such grooves, which are adapted to receive a sealant (not shown) comprising at least a portion of the means for engaging and cooperating with the rotatable shaft to effect a seal therebetween, the grooves 38 (where a pair of such grooves are provided) being in communication to disperse the sealant by means of at least one axial groove 40. In a preferred embodiment, the annular surface includes a plurality of equally spaced axial grooves 40 extending between the circumferential grooves 38 to disperse the sealant.

Referring to FIGS. 1 and 3, the collar 20 includes at least one radially extending bore 42 for injecting the sealant to completely fill the grooves 38 and 40. The bore 42 is advantageously in communication with one of the axial grooves 40, the sealant cooperating with the grooves 38 and 40 and the shaft to effect a seal therebetween. As shown in FIG. 5, the grooves 38, which are generally V-shaped in cross section, are defined by surfaces 38a and 38b intersecting at an angle of approximately 90°.

Referring again to FIGS. 1 and 2, the insert 18 and the collar 20 are split through the shaft-conforming openings 22 and 26 along diameters to include two substantially identical portions 18a, 18b and 20a, 20b, respectively. This is, of course, in conformity with the split-type seal arrangements disclosed and claimed in my earlier U.S. Pat. No. 4,218,870 and my earlier co-pending patent application U.S. Ser. No. 363,375, although it will be appreciated by those skilled in the art that the features of my present invention are equally applicable to either split-type seals or more commonplace continuous seals. However, with a split-type seal, the collar 20 includes means for securing the collar portion 20a and 20b together, such as a pair of threaded bolts 44.

As shown, one of the bolts 44 passes through a countersunk bore 46 in each of the collar portions 20a and 20b to be threaded into a mating bore 48 in the other of the collar portions 20a and 20b. Preferably, the mating bores 48 have been tapped and reamed for precise alignment. By selecting and/or machining the proper sized shaft-receiving opening 22, the collar 20 will rotate with a rotatable shaft by means of a friction fit between the shaft and the shaft-receiving opening 22.

Referring specifically to FIG. 2, the rotatable seal means 16 also preferably includes a backing plate 50 adapted to be positioned behind the seal insert 18. The backing plate 50 may be of a slightly smaller outer diameter than the diameter of the recess 24 and may be of a slightly larger inner diameter than the outer diameter of the rotatable shaft, but the insert portions 18a and 18b of the seal insert 18 are adapted to be disposed in interference fit fashion within the recess 24 so as to fit snugly within the collar 20 and against the rotatable shaft. As will be appreciated from my earlier U.S. Pat. No. 4,215,870, the backing plate 50 is provided as a rigid surface against which spring assemblies (not shown) may urge the seal insert into sealing engagement with the sealing surface 28 of the stationary seal means 12.

While the seal insert 18' and the grooves 38 and 40 have been illustrated, it will be appreciated that either or both may be utilized for effecting a seal with a rotatable shaft. A fluid under pressure will force the lip 34 against the rotatable shaft to effect a seal in the case of the seal insert 18' whereas a sealant will fill the grooves 38 and 40 and cooperate with the rotatable shaft to effect a seal in the case of a shaft-conforming surface defining the opening 22 in the collar 20, and it is contemplated that the unique features of the present invention will have much wider ranging applicability than for use only with my earlier U.S. Pat. No. 4,215,870 and my earlier co-pending patent application U.S. Ser. No. 363,375. Accordingly, while I have illustrated the present invention in use with my earlier inventions, it will be appreciated that the advantages to be derived from using either the seal insert 18' or the grooves 38 and 40 may be enjoyed by anyone having a seal on a shaft.

While in the foregoing specification a detailed description of the invention has been set forth for purposes of illustration, it will be appreciated by those skilled in the art that the details herein given may be varied without departing from the spirit and scope of the invention.

I claim:

1. A sealing assembly for use in a high pressure environment with a device having a rotatable shaft, comprising:

stationary seal means associated with said device and having an opening generally conforming to said rotatable shaft; and rotatable seal means including means facing said high pressure environment for engaging and cooperating with said stationery seal means for effecting a seal therebetween, said rotatable seal means being adapted to be mounted on said rotatable shaft for rotational movement therewith, said rotatable seal means including means facing said high pressure environment for engaging and cooperating with said rotatable shaft for effecting a seal therebetween;

said rotatable seal means also including a collar having an opening generally conforming to said rotatable shaft, said collar having a recess surrounding said opening dimensioned larger than said opening to receive a seal insert, said seal insert having an opening generally conforming to said rotatable shaft comprising at least a portion of said means facing said high pressure environment for engaging and cooperating with said rotatable shaft, said stationery seal means having a sealing surface adapted to cooperate with a corresponding surface of said seal insert, said corresponding surface of said seal insert comprising said means facing said high pressure environment for engaging and cooperating with said stationery seal means for effecting a seal therebetween, said corresponding surface of said seal insert having a groove defining a lip facing said high pressure environment so as to be formed under pressure into sealing engagement with said rotatable shaft, said lip being defined in part by a surface defining said shaft conforming opening in said seal insert and also being defined in part by a surface defining a portion of said groove.

2. The sealing assembly as defined by claim 1 wherein said collar and said insert are split through said shaft-conforming openings.

3. The sealing assembly as defined by claim 2 wherein said collar and said insert are split along diameters, said collar and said insert each including two substantially identical portions.

4. The sealing assembly as defined by claim 3 wherein said collar includes means for securing said collar portions together, said insert portions being adapted to be disposed in interference fit fashion within said recess in said collar.

5. The sealing assembly as defined in claim 4 wherein said opening in said collar is defined by an annular surface, said surface being dimensioned substantially identically with said rotatable shaft.

6. The sealing assembly as defined by claim 5 wherein said annular surface includes at least one circumferential groove adapted to receive a sealant, said sealant in said groove also comprising a portion of said means for engaging and cooperating with said rotatable shaft.

7. The sealing assembly as defined by claim 6 including a pair of circumferential grooves in said annular surface adapted to receive a sealant, said grooves being in communication to disperse said sealant by means of at least one axial groove.

8. The sealing assembly as defined by claim 7 including a plurality of equally spaced axial grooves extending between said circumferential grooves, said collar including a radially extending bore communicating with one of said axial grooves for injecting said sealant to completely fill said axial and circumferential grooves.

9. The sealing assembly as defined by claim 1 wherein said opening in said collar is defined by an annular surface, said surface being dimensioned substantially the same as said rotatable shaft.

10. The sealing assembly as defined by claim 9 wherein said annular surface includes at least one circumferential groove adapted to receive a sealant, said sealant in said groove comprising at least a portion of said means for engaging and cooperating with said rotatable shaft.

11. The sealing assembly as defined by claim 1 including a pair of circumferential grooves in said annular surface adapted to receive a sealant, said grooves being in communication to disperse said sealant by means of at least one axial groove.

12. The sealing assembly as defined by claim 11 including a plurality of equally spaced axial grooves extending between said circumferential grooves, said collar including a radially extending bore communicating with one of said axial grooves for injecting said sealant to completely fill said axial and circumferential grooves.

13. The sealing assembly as defined by claim 12 wherein said bore is in communication with one of said axial grooves, said sealant cooperating with said grooves and said shaft to effect a seal therebetween.

14. The sealing assembly as defined by claim 13 wherein said grooves are generally V-shaped in cross-section, each of said grooves being defined by surfaces intersecting at an angle of approximately 90°.

15. The sealing assembly as defined by claim 1 wherein said lip is defined in part by a surface defining said opening in said insert, said lip also being defined in part by a surface defining a portion of said groove.

16. The sealing assembly as defined by claim 15 wherein said surface defining a portion of said groove is tapered, said lip being generally wedge-shaped in cross-section.

* * * * *